US008309204B2

(12) United States Patent
Graff

(10) Patent No.: US 8,309,204 B2
(45) Date of Patent: Nov. 13, 2012

(54) ABSORBENT SHEET WITH UNIQUE EMBOSSING PATTERN

(75) Inventor: Pierre Graff, Wolfgantzen (FR)

(73) Assignee: Georgia-Pacific France, Kunheim (FR)

( * ) Notice: Subject to any disclaimer, the term of this patent is extended or adjusted under 35 U.S.C. 154(b) by 489 days.

(21) Appl. No.: 12/532,686

(22) PCT Filed: Mar. 12, 2008

(86) PCT No.: PCT/FR2008/000316
§ 371 (c)(1), (2), (4) Date: Sep. 23, 2009

(87) PCT Pub. No.: WO2008/132331
PCT Pub. Date: Nov. 6, 2008

(65) Prior Publication Data
US 2010/0035011 A1 Feb. 11, 2010

(30) Foreign Application Priority Data
Mar. 28, 2007 (FR) ...................................... 07 02267

(51) Int. Cl.
*B32B 3/00* (2006.01)
*D21H 27/40* (2006.01)

(52) U.S. Cl. ......... 428/154; 428/166; 428/172; 162/113

(58) Field of Classification Search .................. 428/152, 428/153, 154, 156, 166, 172; 162/109, 113
See application file for complete search history.

(56) References Cited

U.S. PATENT DOCUMENTS

| | | | | |
|---|---|---|---|---|
| 3,414,459 | A | 12/1968 | Wells | |
| 3,867,225 | A | 2/1975 | Nystrand | |
| 6,235,373 | B1 * | 5/2001 | Graff | 428/172 |
| 2003/0021953 | A1 * | 1/2003 | Graff | 428/153 |
| 2003/0118782 | A1 * | 6/2003 | Graff | 428/172 |
| 2004/0081804 | A1 | 4/2004 | Basler et al. | |
| 2004/0231813 | A1 | 11/2004 | Basler et al. | |
| 2005/0067089 | A1 | 3/2005 | Graff et al. | |
| 2006/0062972 | A1 | 3/2006 | Du Grosriez et al. | |

OTHER PUBLICATIONS

PCT International Search Report for International Application No. PCT/FR2008/000316—filed Mar. 12, 2008; Date of Mailing: Sep. 23, 2008.
PCT Written Opinion for International Application No. PCT/FR2008/000316—filed Mar. 12, 2008.

* cited by examiner

*Primary Examiner* — Donald J Loney
(74) *Attorney, Agent, or Firm* — Drinker Biddle & Reath LLP

(57) ABSTRACT

A cut or precut absorbent sheet intended in particular for wiping includes at least two plies or groups of plies of creped absorbent paper with a basis weight ranging between 12 and 35 g/m$^2$ per ply, at least one of the plies having an embossed pattern made up of protrusions directed towards the inside of the sheet and forming cavities between them. Some of the protrusions are distributed over at least one of the plies in such a way as to define portions of curves which in particular form concentric circles around or near the geometric center of the outline of the sheet; and the set of protrusions belonging to one ply of the sheet forms alignments which constitute an embossed pattern with central symmetry with respect to the geometric center of the outline of the sheet.

12 Claims, 11 Drawing Sheets

ABSORBENT SHEET WITH UNIQUE EMBOSSING PATTERN

CROSS REFERENCE TO RELATED APPLICATIONS

This application claims benefit of priority under 35 U.S.C. 119 to French Patent Application No. 0702267, filed Mar. 28, 2007, and PCT/FR2008/000316, filed Mar. 12, 2008, the entire contents of which are hereby incorporated by reference.

BACKGROUND OF THE INVENTION

The present invention relates to an absorbent sheet having at least two plies each including at least one embossed sheet of creped absorbent paper.

The invention relates in particular to an absorbent sheet intended for the field of wiping in a domestic or industrial application that is to say one that can be used as kitchen paper, towel, etc.

In the domestic or sanitary paper industry use is made, for producing the various products, of a creped absorbent paper with a low basis weight, usually ranging between 12 and 35 g/m$^2$ per ply, such as cellulose fiber wadding or tissue paper. The ability of this material to stretch, which ability is conferred upon it by the creping operation, is put to good use for embossing it. The absorbent paper may be of the TAD (Through Air Dried) or alternatively of the CWP (Conventional Wet Pressed) type, these being two paper making techniques well known to those skilled in the art.

What happens is that embossing gives the sheet some bulk and improves its absorption of liquids, its feel and its softness. Attempts have also been made to increase the absorption capacity still further by creating multi-layer sheets which are obtained by combining at least two layers, also known as plies, each consisting of at least one of said embossed sheets.

There are two methods of embossing and assembling the plies in common use, and the one used depends on the desired properties of the end product.

The first is known in the art by the term "nested". It consists first of all in embossing each of the plies separately so as to form, at the surface, protrusions which are generally substantially frustoconical or in the shape of pyramid frustums. Next, adhesive is applied to the tops of the protrusions of one of the plies and the plies are positioned in such a way that the faces exhibiting the protrusions face each other, the protrusions of one of them falling between the protrusions of the other. The plies are finally assembled in such a way that the protrusions that have been coated with adhesive fit or nest between the protrusions of the other ply. Thus, the two plies are connected by spots of glue between the tops of the protrusions of one ply and unembossed zones between the protrusions of the other ply. A structure is produced in which the voids formed are able to give the sheet improved absorption. Furthermore, the exterior faces are smooth and gentle to the touch because of the recessed zones formed by the backs of the protrusions. This technique is illustrated for example in U.S. Pat. No. 3,867,225.

Another known practice is to replace the adhesive bond by a mechanical connection achieved by knurling or marking.

A second method of assembly is known in the art as points/points. It differs from the previous mode of assembly in the relative positioning of the two plies. These, once they have been embossed separately, are brought together in such a way as to cause the tops of the protrusions to coincide with each other. The plies are joined together by the tops of the protrusions, points to points. This technique is illustrated in U.S. Pat. No. 3,414,459.

When considering the practical embodiments of these structures, whether they be of the "nested" or "points/points" type, it is found that the protrusions are often arranged in straight rows of uniform array or alternatively in patterns made up of polygonal figures, hexagons or diamonds, distributed uniformly in both directions, the machine direction and the cross direction, possibly in the form of arcs or curves, in particular forming sets which are uniformly distributed over the surface of a cut sheet.

Surprisingly, it has been found that certain properties of the product could be improved by choosing a different distribution of the protrusions on each absorbent sheet.

BRIEF DESCRIPTION OF THE INVENTION

According to an embodiment of the invention, the cut or precut absorbent sheet intended in particular for wiping, includes at least two plies or groups of plies of creped absorbent paper with a basis weight ranging between 12 and 35 g/m$^2$ per ply, at least one of the plies having an embossed pattern made up of protrusions directed towards the inside of the sheet and forming cavities between them.

According to another embodiment of the invention, some of the protrusions are distributed over at least one of the plies in such a way as to define portions of curves which in particular form concentric circles around or near the geometric center of the outline of the sheet; and the set of protrusions belonging to one ply of the sheet forms alignments which constitute an embossed pattern with central symmetry with respect to the geometric center of the outline of said sheet.

This advantageous arrangement of the protrusions leads to an improvement in the absorption and in the strength of each sheet, as will be explained and proven hereinafter.

Furthermore, on each sheet, the embossing pattern may display symmetry of order 2.

As a preference, at least 50% of the protrusions are aligned along curve portions. According to one embodiment of the invention, the embossed pattern includes a central zone formed of concentric circles.

According to another embodiment of the invention, the embossed pattern includes a central zone formed of protrusions aligned in a spiral.

Furthermore, the embossed pattern may include a complementing zone that complements the central zone and is formed of mutually parallel lines of protrusions.

The lines of protrusions may be straight and/or curved.

Without departing from the scope of the invention, the embossed pattern further includes a peripheral zone flanking the central zone and/or the complementing zone.

As a novel and advantageous feature, these various types of embossing lead, within each sheet, not only to advantageous technical features but also to a look which is novel and attractive to the consumer.

According to one particular embodiment of the invention, each sheet may include two embossed plies associated with one another in an arrangement of the "nested" type.

The plies that form the sheet may be combined by adhesive bonding.

In each sheet according to an embodiment of the invention, the protrusions have a mean density ranging between 2 and 50 protrusions per cm$^2$.

BRIEF DESCRIPTION OF THE DRAWINGS

Other features, details and advantages of the invention will become more clearly apparent from reading the description which will follow, given by way of entirely nonlimiting illustration with reference to the attached drawings in which.

DETAILED DESCRIPTION OF THE INVENTION

Figure 1:
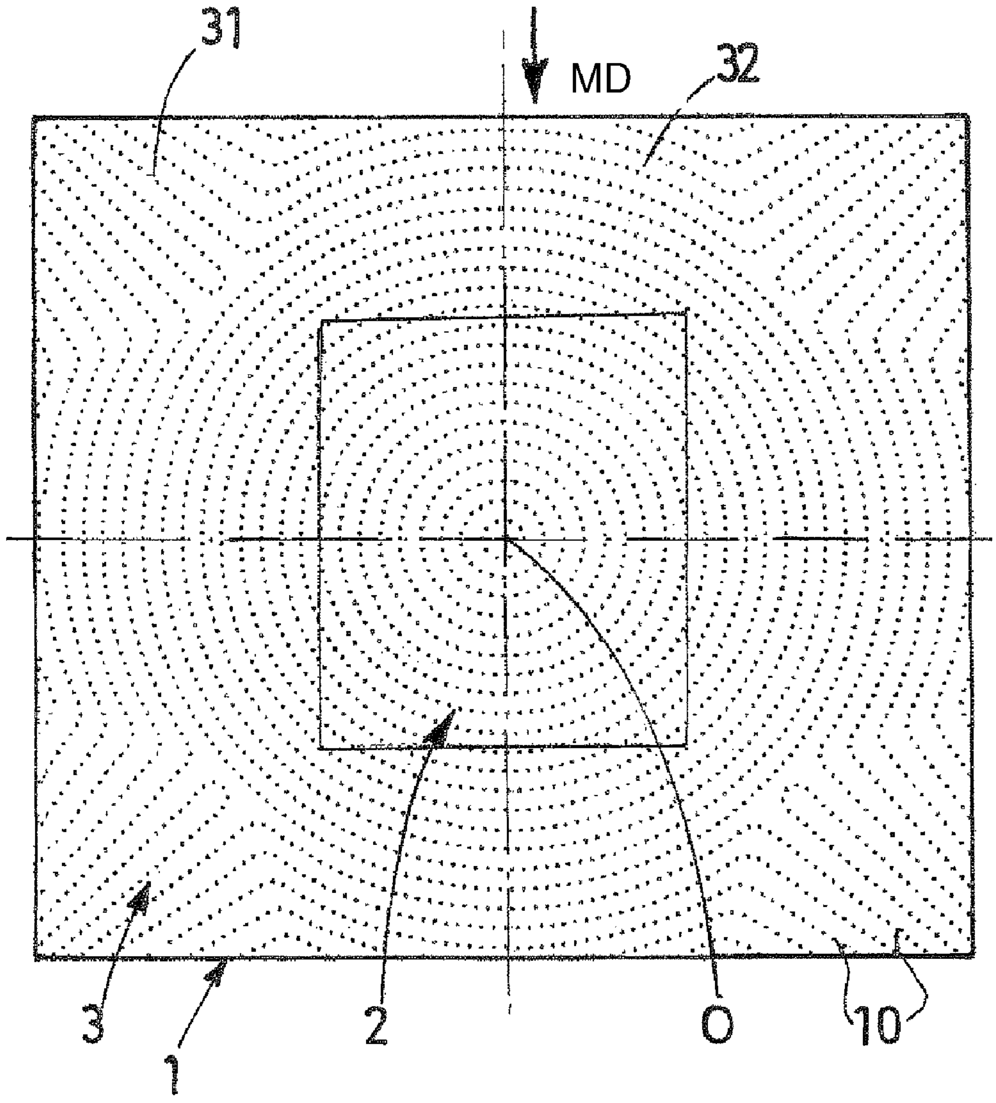
FIG. 1 is a depiction of an embossed ply forming an exterior face of an absorbent sheet according to an embodiment of the invention.

FIG. 1 illustrates an absorbent sheet in format, that is to say cut to an outline 1 and having, within said outline 1, embossing comprising protrusions here identified by dots 10.

As a preference, the surface area at the top of each protrusion 10 is smaller than 6 mm$^2$, although different sizes of protrusion 10 can be found in the same pattern; and the tops of the protrusions are directed towards the inside of the sheet which includes at least two plies.

According to FIG. 1, most (at least 50%) of the protrusions 10 are distributed in such a way as to define concentric circles around a point 0 situated substantially at the geometric center of the sheet the outline 1 of which is preferably square or substantially square.

Furthermore, the set of protrusions 10 present on the ply in question forms an embossed pattern with central symmetry with respect to the geometric center 0 of the outline 1 of the sheet.

As a preference, the embossing pattern displays symmetry of order 2, respectively along the two perpendicular axes represented by dashed line in FIG. 1 and FIGS. 4, 5, 8 and 9.

Thus, according to the embodiment depicted in FIG. 1, around a central zone 2 formed of concentric circles there is a complementing zone 3 in which the embossing protrusions 10 are aligned.

The lines thus formed, 31, 32, may be mutually parallel as illustrated in FIG. 1, and for the technical reasons explained hereinafter.

Figure 2:
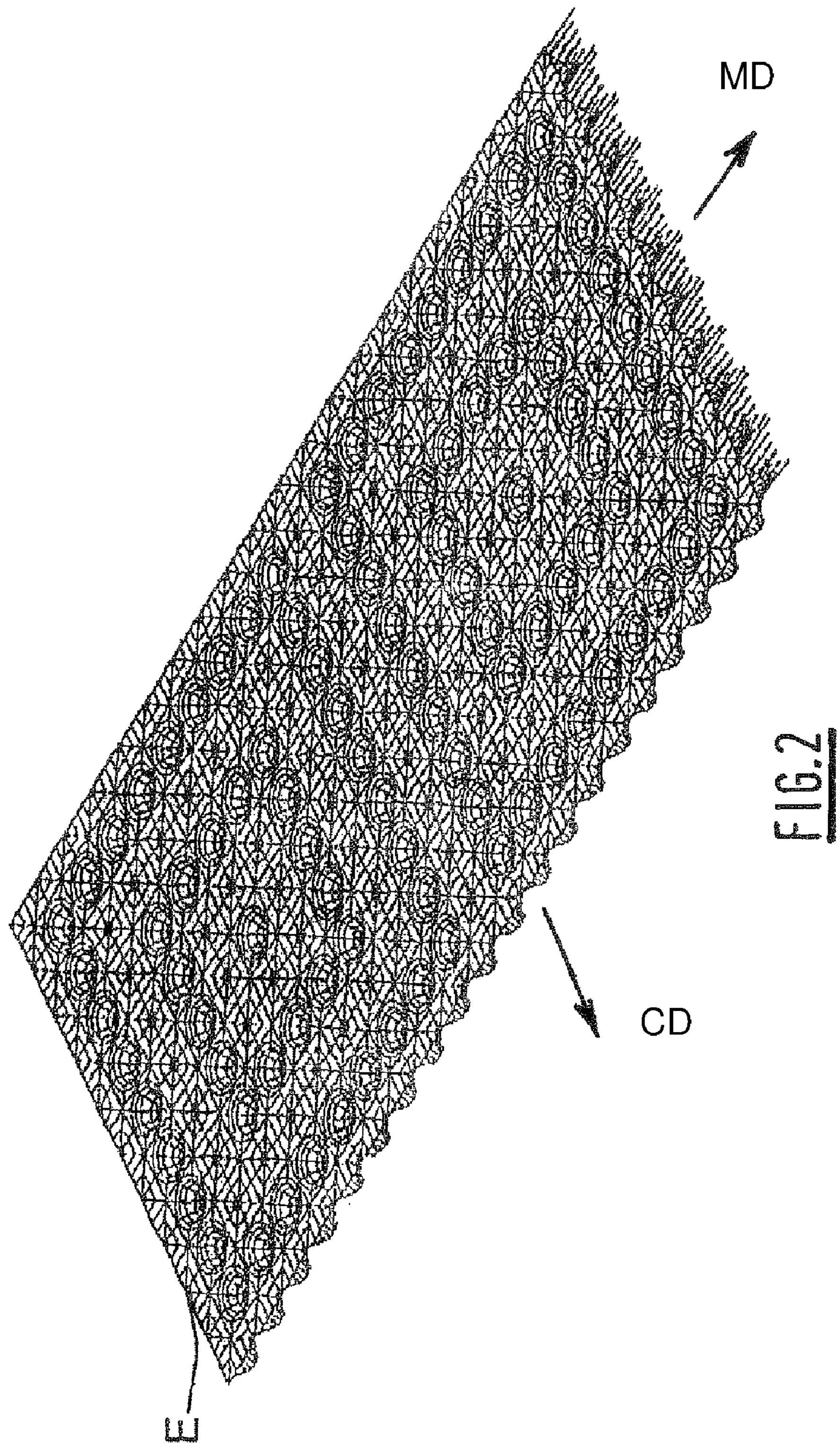
FIG. 2 is a perspective view of a finite element grid for square patterns.

FIG. 2 shows a mathematical simulation, using a well known method known as the finite element method, for simulating the tensile behavior in two mutually perpendicular directions: one in the machine direction MD of a sheet and the other in the cross direction CD. In the conventional way, the machine direction MD is the direction in which the sheet is unwound while the cross direction CD, which is perpendicular to the machine direction MD, is the direction of the perforations or precut lines between the various formats when producing rolls of sheets of the toilet paper or kitchen paper type.

FIG. 2 depicts a simulation of an embossing configuration in an array of uniformly distributed dots forming concentric squares.

Figure 3:
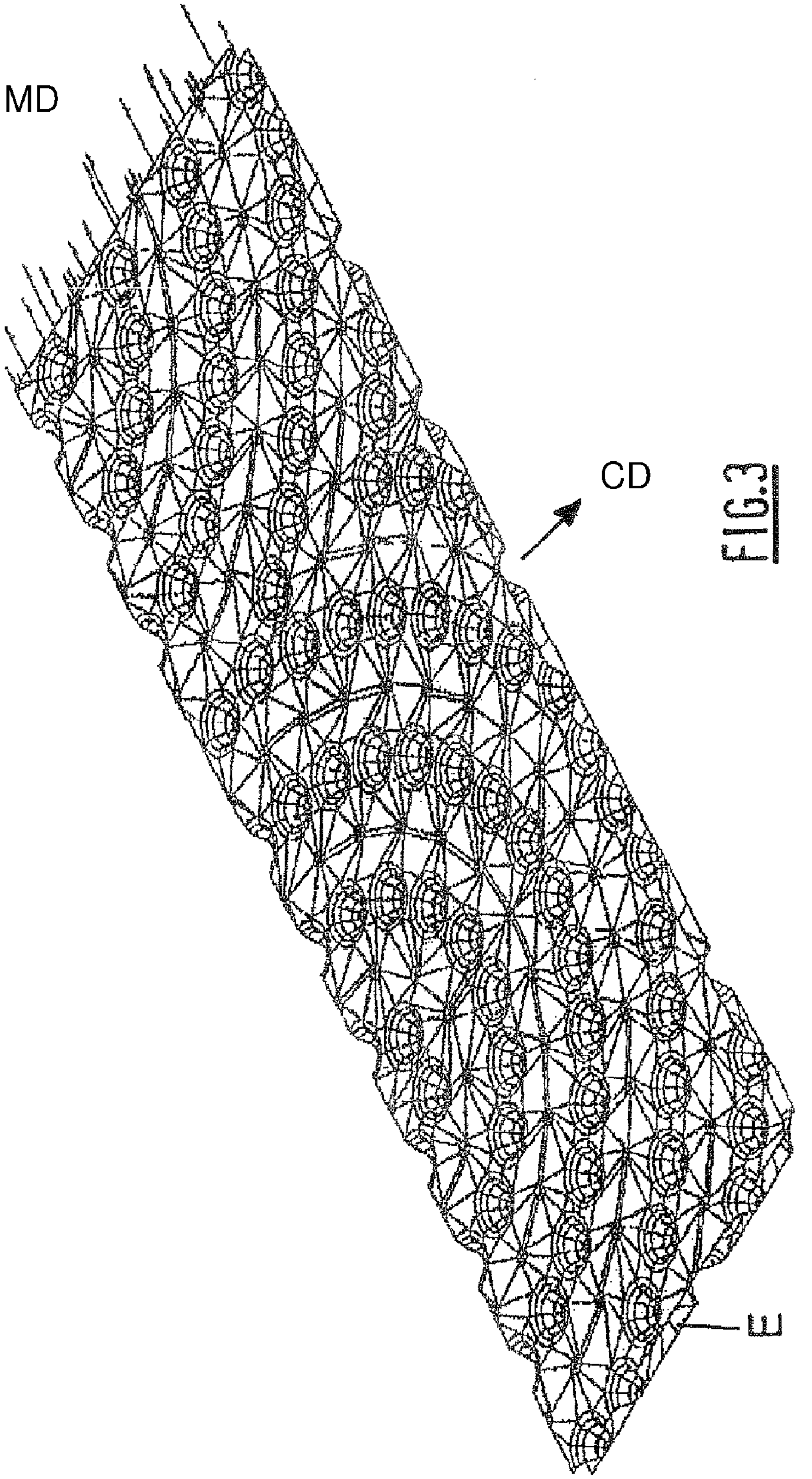
FIG. 3 is a partial perspective view of a finite element grid for circular patterns.

By comparison, in FIG. 3, the simulation relates to an embossed pattern consisting of concentric circles formed by uniformly spaced dots.

The mathematical simulation consisted in applying tensile load to one of the edges of a rectangular specimen as illustrated in FIGS. 2 and 3, the opposite edge E being immobilized (clamping). The tension was applied in the machine direction MD and values of the stresses introduced into the sheet at each point in the grid structure (that is to say on each protrusion of the sheet) in the direction of the load were obtained.

The calculations were performed on the assumption of orthotropic elastic linear behavior (where at every point there are two, orthogonal, symmetries in mechanical behavior), using shell elements.

Tensile tests were carried out preliminarily on specimens in order to determine the elastic modulus $E_M$ in the machine direction and $E_C$ in the cross direction.

Here, $E_M$=24 MPa and $E_C$=80 MPa.

The Poisson's ratios chosen were:

$\nu_M$=0.37 and $\nu_C$=1.23

The shear modulus $$G_M = \frac{E_M}{2\times(1+\nu_M)}$$

These values were entered into the aforementioned finite element calculation in order to simulate the orthotropic behavior of the product.

The follow were obtained in particular:

| | Mean stress (in MPa), machine direction |
|---|---|
| Squares: FIG. 2 | 0.423 |
| Circles: FIG. 3 | 0.499 |

This result leads to the conclusion that embossing according to FIG. 3, based on concentric circles, is able to withstand higher mechanical stresses and therefore displays better mean tensile strength in the direction considered (the machine direction).

Figure 4:
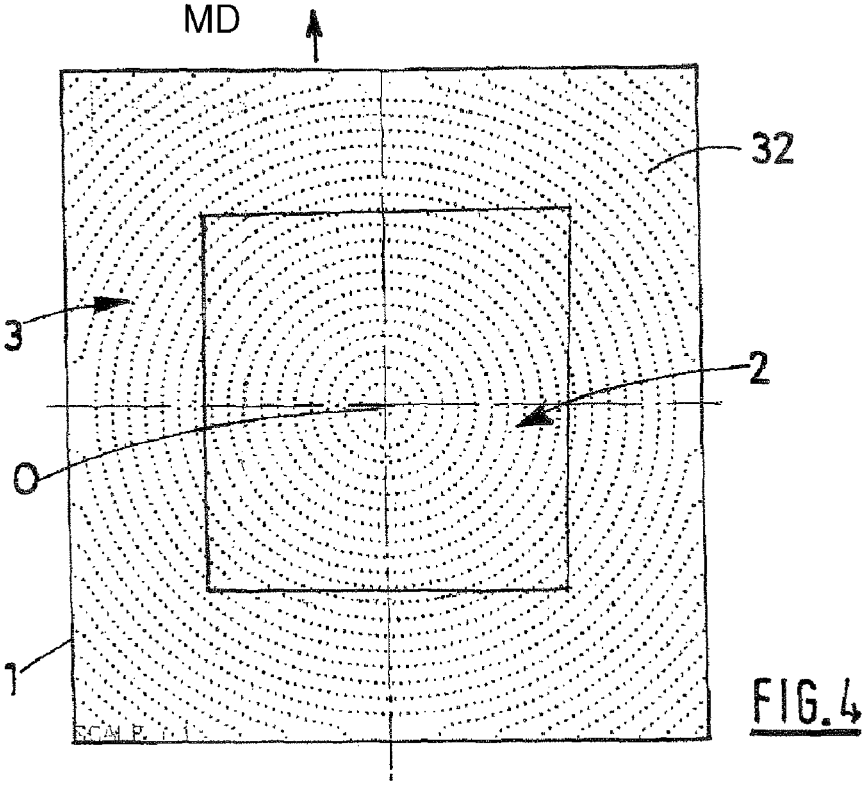
FIGS. 4 and 5 are variants of FIG. 1 for a first and a second ply of a sheet, respectively.
Figure 5:
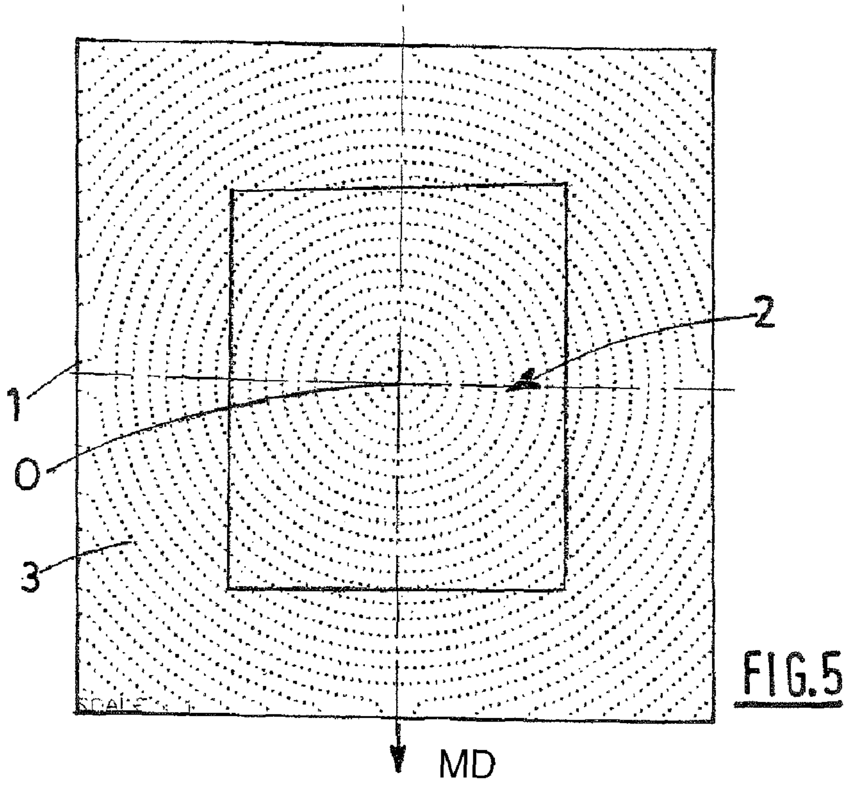

FIGS. 4 and 5 illustrate embossing patterns according to an embodiment of the invention: more specifically, FIG. 4 shows the embossing of a first ply and FIG. 5 the embossing of a second ply associated with the first ply using the "nested" technique.

According to the embodiment of the invention illustrated in these figures, the sheets of outline 1 have a geometric center 0, a central zone 2 in which the embossing pattern is formed of concentric circles, and a complementing zone 3 in which the embossing comprises curved lines of protrusions 32; and symmetry of order 2 along the two axes shown in dashed line, is achieved.

Figure 6:
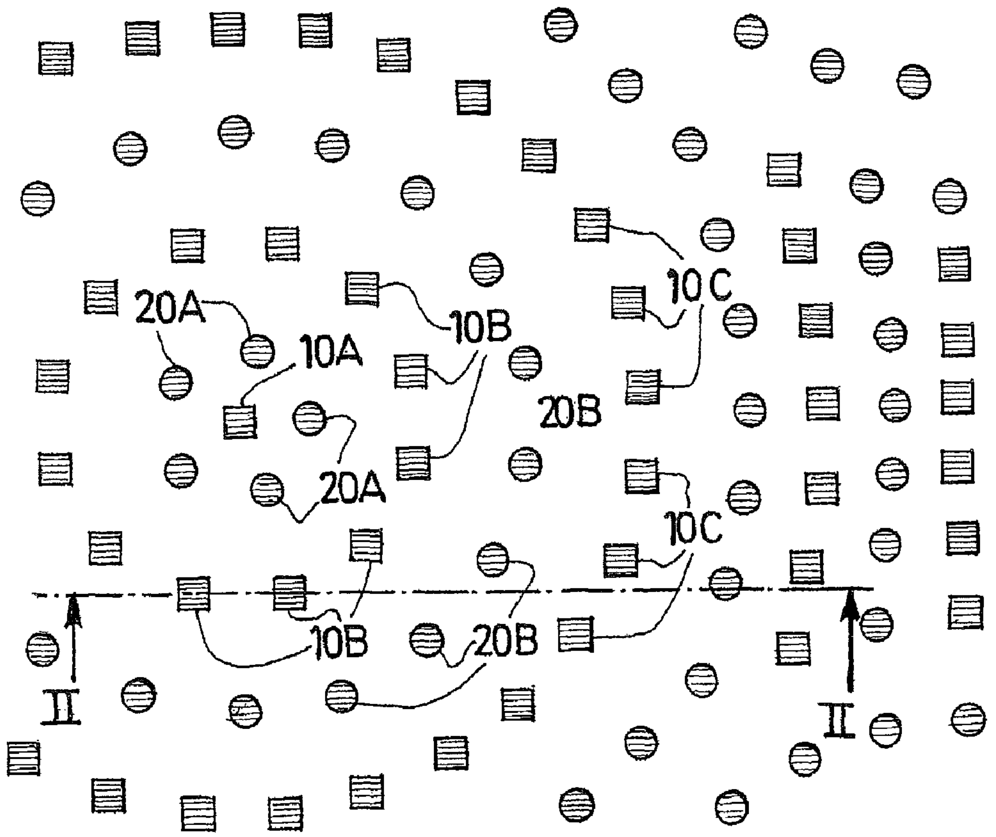
FIG. 6 depicts an absorbent sheet according to an embodiment of the invention, viewed from above on the line I-I of FIG. 7.
Figure 7:
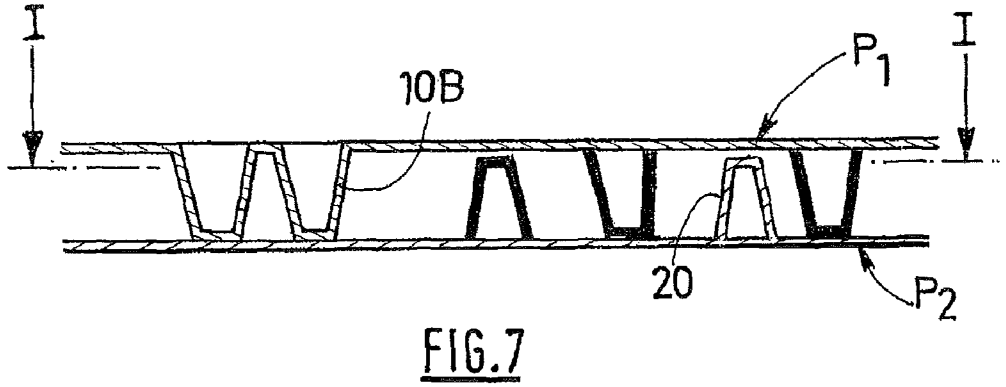
FIG. 7 depicts a cross section through the sheet, the line of section being on II-II of FIG. 6.

FIGS. 6 and 7 show in greater detail an exemplary embodiment of the central part of an absorbent sheet consisting of two absorbent plies P1 and P2 each made up of paper making fibers, creped tissue for example. For an application as a kitchen paper, their basis weight is preferably greater than 20 $g/m^2$ and at least 12 $g/m^2$.

As can be seen in FIG. 7, each of the plies comprises protrusions 10 and 20 respectively. These protrusions have been obtained by embossing the plies, as is well known in the art, between an engraved roll and a roll with a rubber covering. These protrusions increase the apparent thickness of the plies. Thus, the basic sheet may be 0.1 to 0.45 mm thick, but after embossing, its apparent thickness may range from 0.55 to 2 mm. Corresponding to each protrusion on one side is a cavity on the other. These protrusions are in the shape of cone or pyramid frustums the cross section of which may be polygonal, oval, circular or some other shape and the main axis of which may be directed either in the machine direction or the cross direction (the machine direction is the direction in which the paper is fed through the machinery while it is being manufactured). The two plies are associated using the "nested" structure. The protrusions 10B of one of the plies P1 are slightly taller than those 20 of the second ply P2. The bond between the plies may be achieved by a layer of an adhesive substance, generally water based, interposed between the tops of the protrusions 10 and the surface of the ply P2. The protrusions 20 are at most the same height as the protrusions 10.

FIG. 6 does not exactly reproduce the appearance of a sheet viewed from above, as the protrusions 20 are seen here by transparency. The cross section of the protrusions 10 of the ply P1 has been given a square shape and that of the protrusions 20 of the ply P2 has been given a round shape, but in practice, this cross section can be chosen to be some other shape. For this embodiment, the protrusions are arranged in circular directions. The protrusions 10B of the ply P1, which together form a full circle, are imbricated between two concentric rows 20A and 20B of protrusions of the ply P2. The protrusions 20B are themselves imbricated between the protrusions 10B and 10C which are aligned in concentric circles.

Most, at least 50%, of the protrusions arranged in circles are imbricated between protrusions of the opposite ply, themselves arranged in circles. The minimum distance between two circles of the same ply is determined in such a way as to allow a row of protrusions of the opposite ply to be inserted between them. Obviously, the embodiment depicted is non-limiting; numerous other patterns are conceivable.

Figure 8:
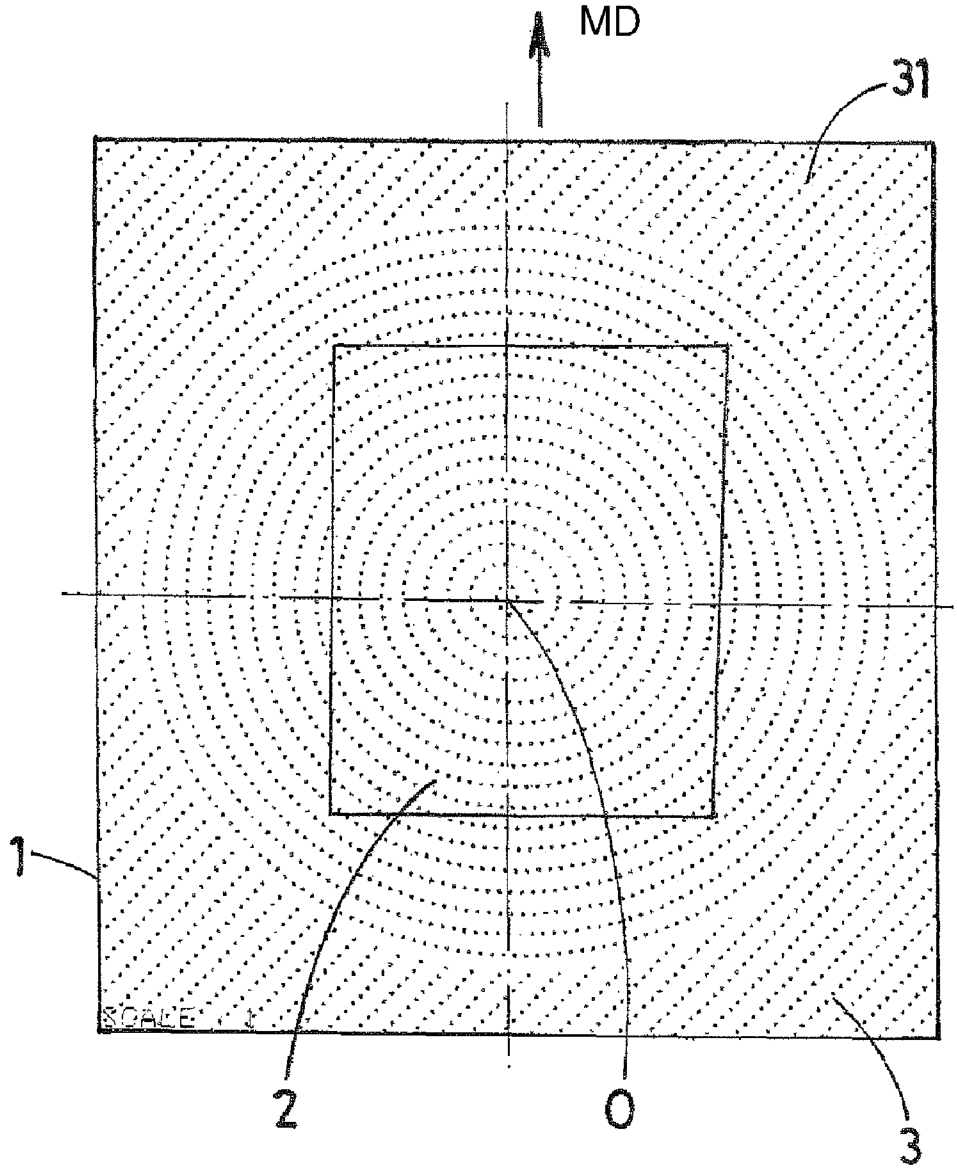
FIG. 8 illustrates an embossed ply according to another embodiment of the invention.

Thus, FIG. 8 illustrates the embossing of a ply comprising a central zone 2 formed of protrusions aligned in a spiral, and a complementing zone 3 in which the protrusions are aligned in mutually parallel straight lines 31.

Figure 9:
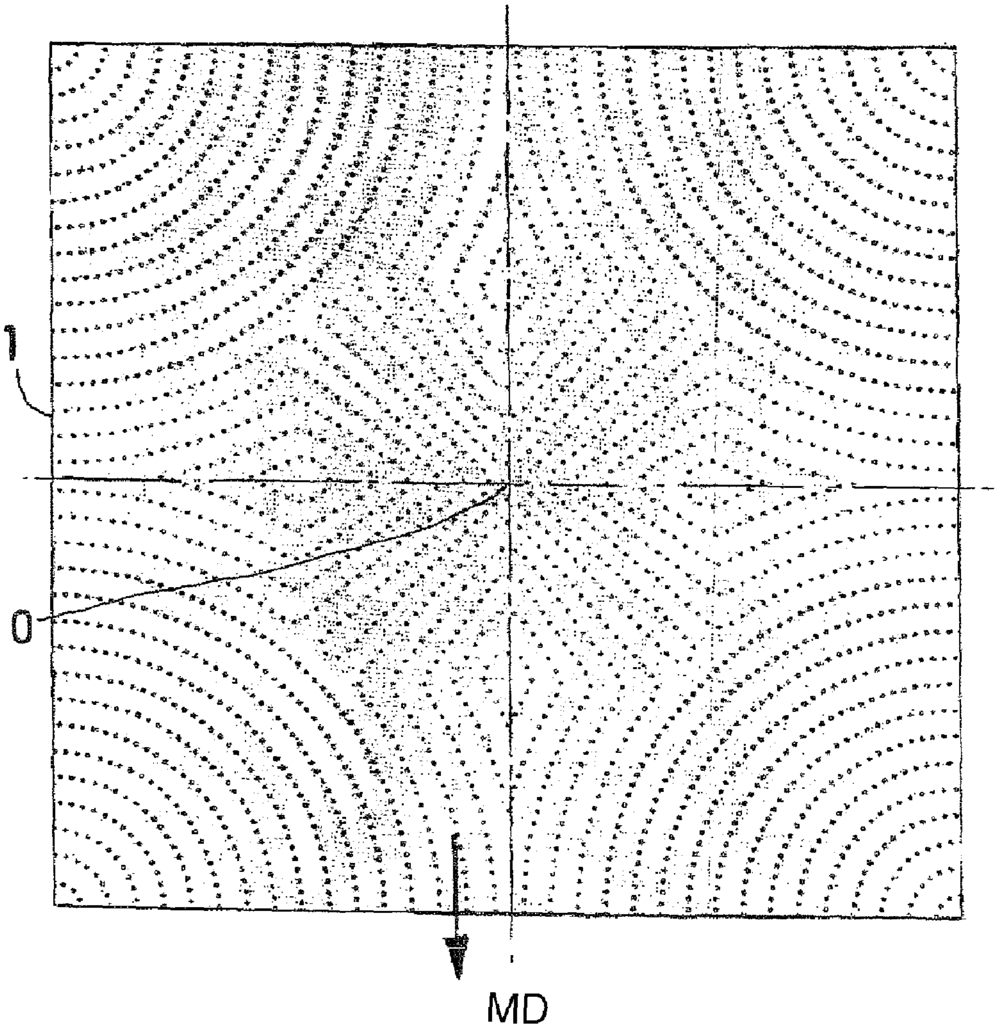
FIG. 9 relates to an embossed ply according to yet another embodiment of the invention.

Furthermore, without departing from the scope of the invention and as illustrated nonlimitingly in FIG. 9, some of the protrusions may be distributed in curve portions near the geometric center O of the cut sheet. Here, the curve portions are arranged in quarters of concentric circles near the four corners of said sheet.

Figure 10:
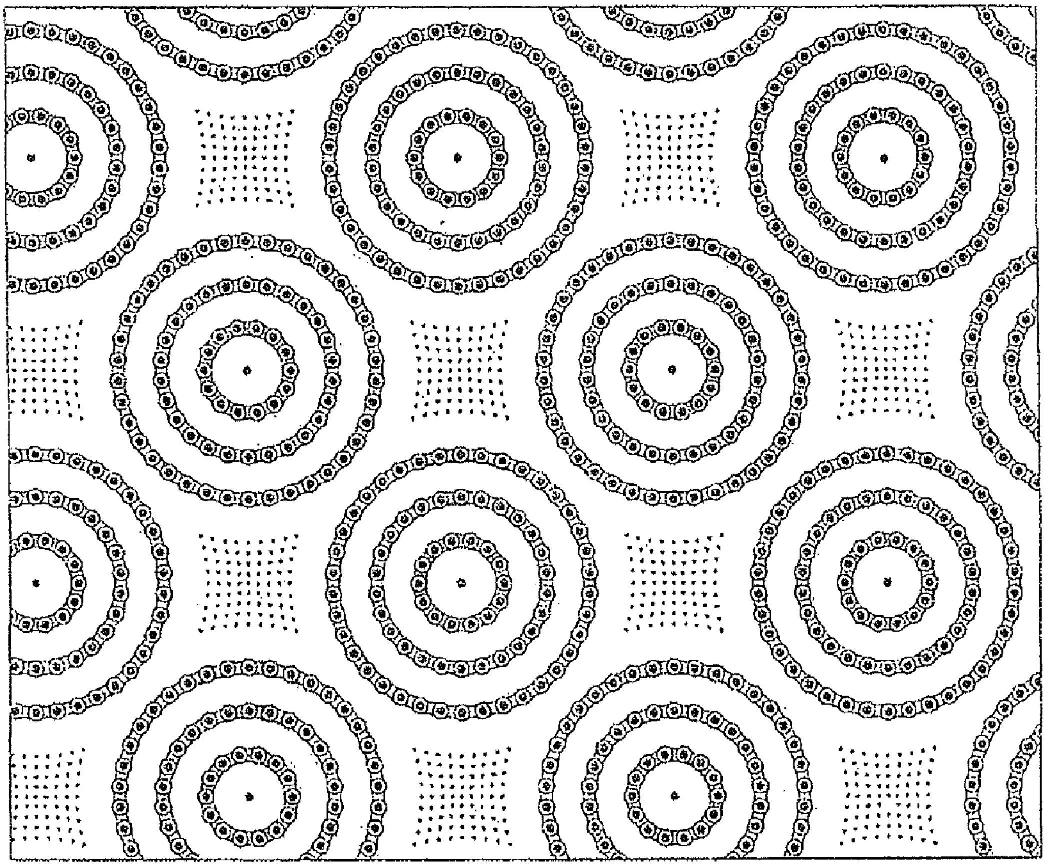
FIG. 10 is an embossing pattern of the prior art.

Furthermore, comparative testing has been performed on sheets according to the invention and absorbent sheets according to the prior art which in this instance have at least one ply with an embossed pattern according to FIG. 10. This embossed pattern consists of sets of three concentric circles, juxtaposed, and of microembossings in the empty spaces between the sets of circles.

A sheet according to this prior art comprises a great many sets of circles thus defined, juxtaposed across the surface of the cut sheet.

According to the tests conducted with respect to absorption, the specimen was placed flat on a porous plaque of sintered glass in which the pore size was determined to be 40 μm. A plate bearing weights was placed on the specimen in order to keep the specimen flat. The specimen was thus slightly compressed. The porous plaque rested on a plate which, at its center had an orifice of 3 mm diameter onto which a flexible tube opened from beneath in order thus to place the volume of the porous plaque in communication with a container of liquid the head height of which could be adjusted with respect to the level of the porous plaque. The container itself was placed on a balance. This means makes it possible to determine the amount of liquid that has passed into the specimen when the container is raised with respect to the porous plaque.

The liquid was water containing 9 g/l of sodium chloride.

The procedure was to impregnate the specimen through the porous plaque by lowering the level of the specimen relative to the container. The amount of liquid absorbed was measured every 10 seconds simply by measuring the loss of water from the reservoir. This was done with various weights.

It is possible to measure absorption capacity also without applying pressure.

Figure 11:
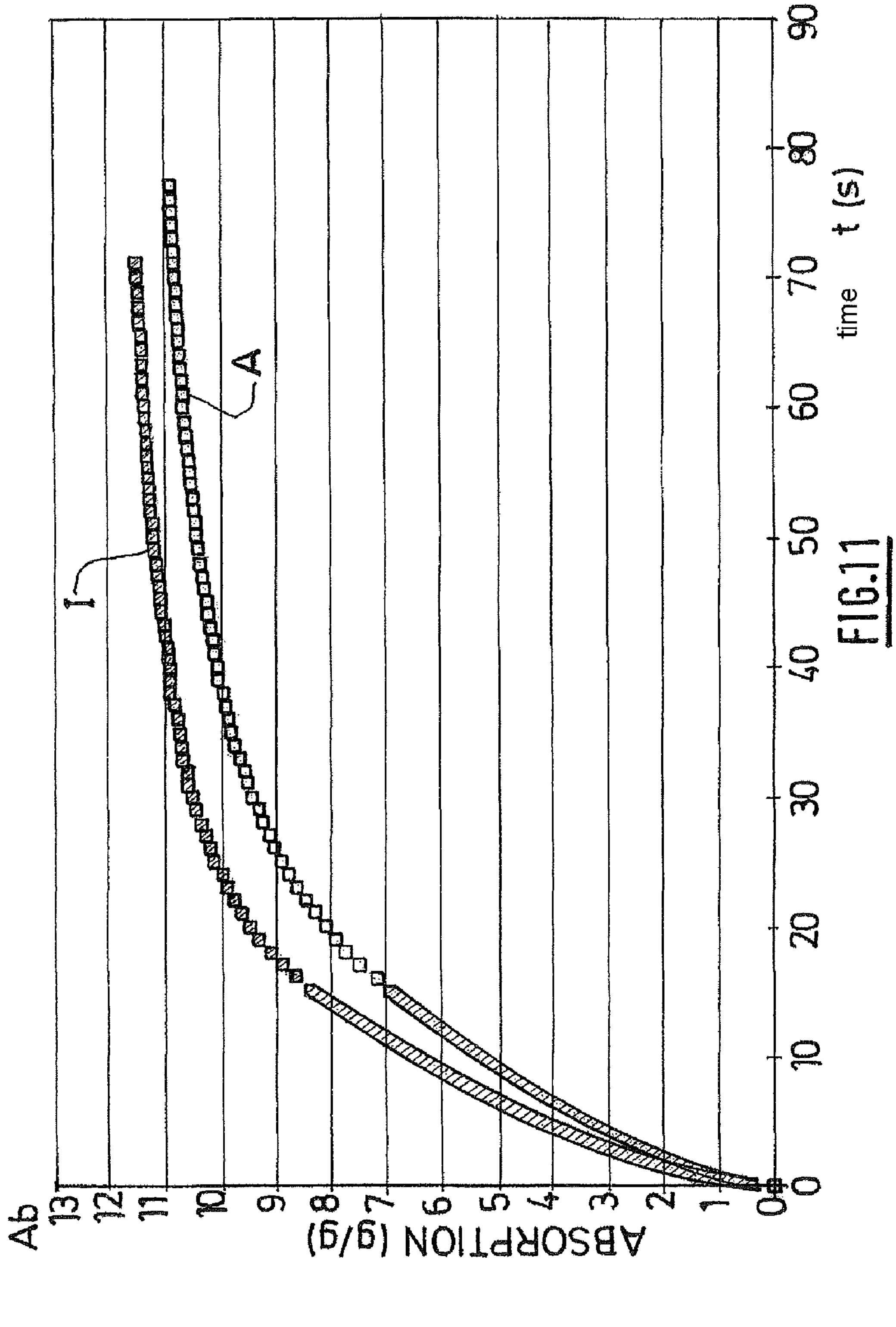
FIG. 11 shows comparative absorption curves for a product of the prior art and a product according to the invention.

FIG. 11 gives the curves obtained respectively for an embossed sheet according to the prior art (curve A) and an embossed sheet according to the invention (curve I).

Of course, the nature and thickness of the sheets were identical and only the arrangement of the protrusions that form the embossing pattern differed. The sheets were made from a web of tissue obtained using the CWP (conventional wet pressed) technique; and the protrusions had a mean diameter of about 1 mm, a depth of about 1.4 mm and their density was 6.7 per $cm^2$.

Furthermore, the specimens measured were circles with a diameter of 7.62 cm made from cellulose fiber wadding tissue from a paper with a basis weight of 44.2 $g/m^2$, approximately 0.23 mm thick and with embossing patterns according to one of FIGS. 4 and 5.

In FIG. 11, the absorption Ab (in g/g) is plotted on the ordinate axis and the time t (in s) is plotted on the abscissa axis.

Curve A has a gradient which at the origin is lower than curve I, signifying that the product according to the prior art has a lower rate of absorption. Furthermore, the value of the asymptote in curve A is lower than that of curve I, signifying that the absorption according to the invention is superior to that of the prior art.

Figure 12A:
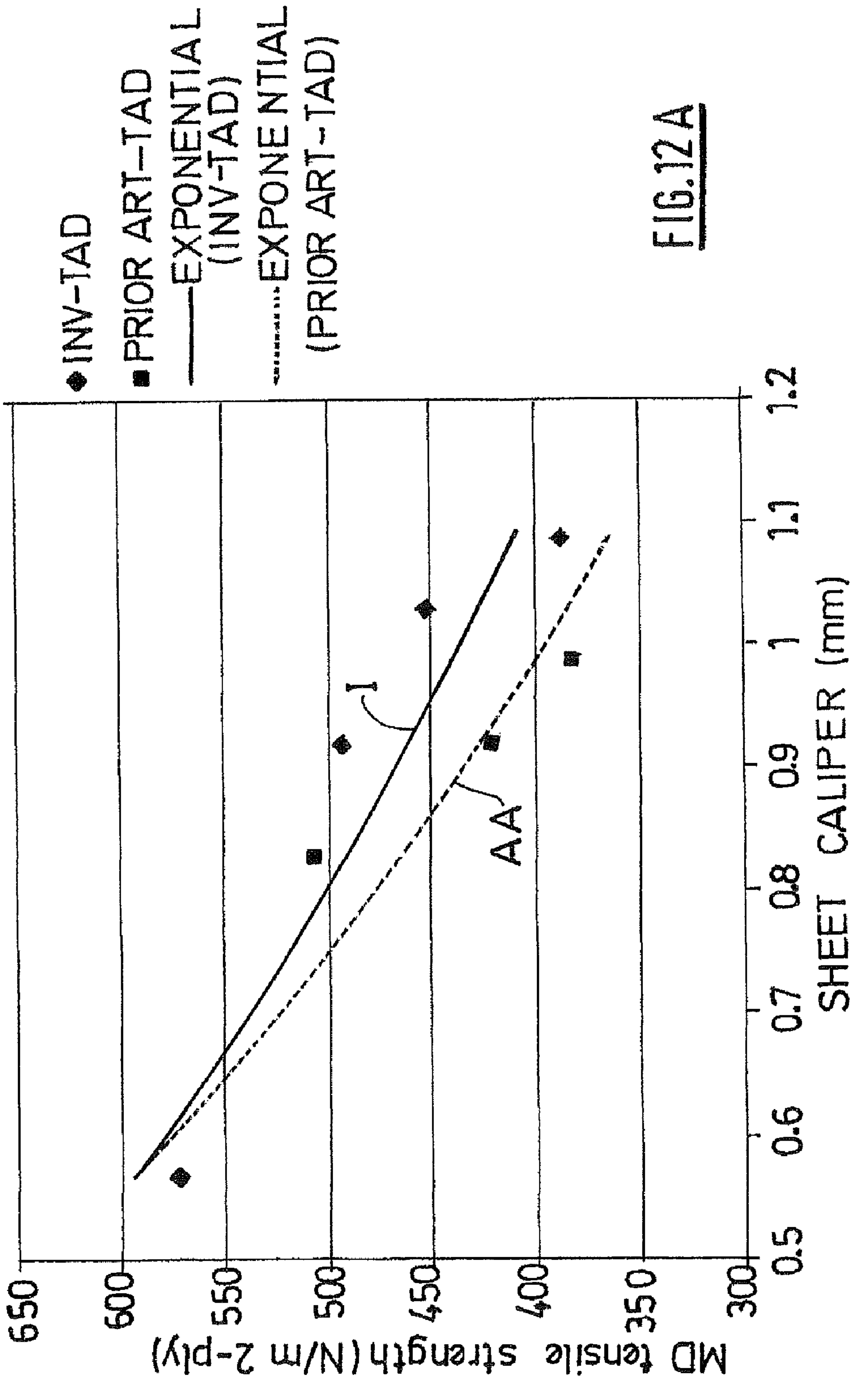
FIGS. 12A and 12B show comparative strength curves for a tissue of the TAD type, in the machine direction and the cross direction of each sheet, respectively, as a function of sheet thickness.
Figure 12B:
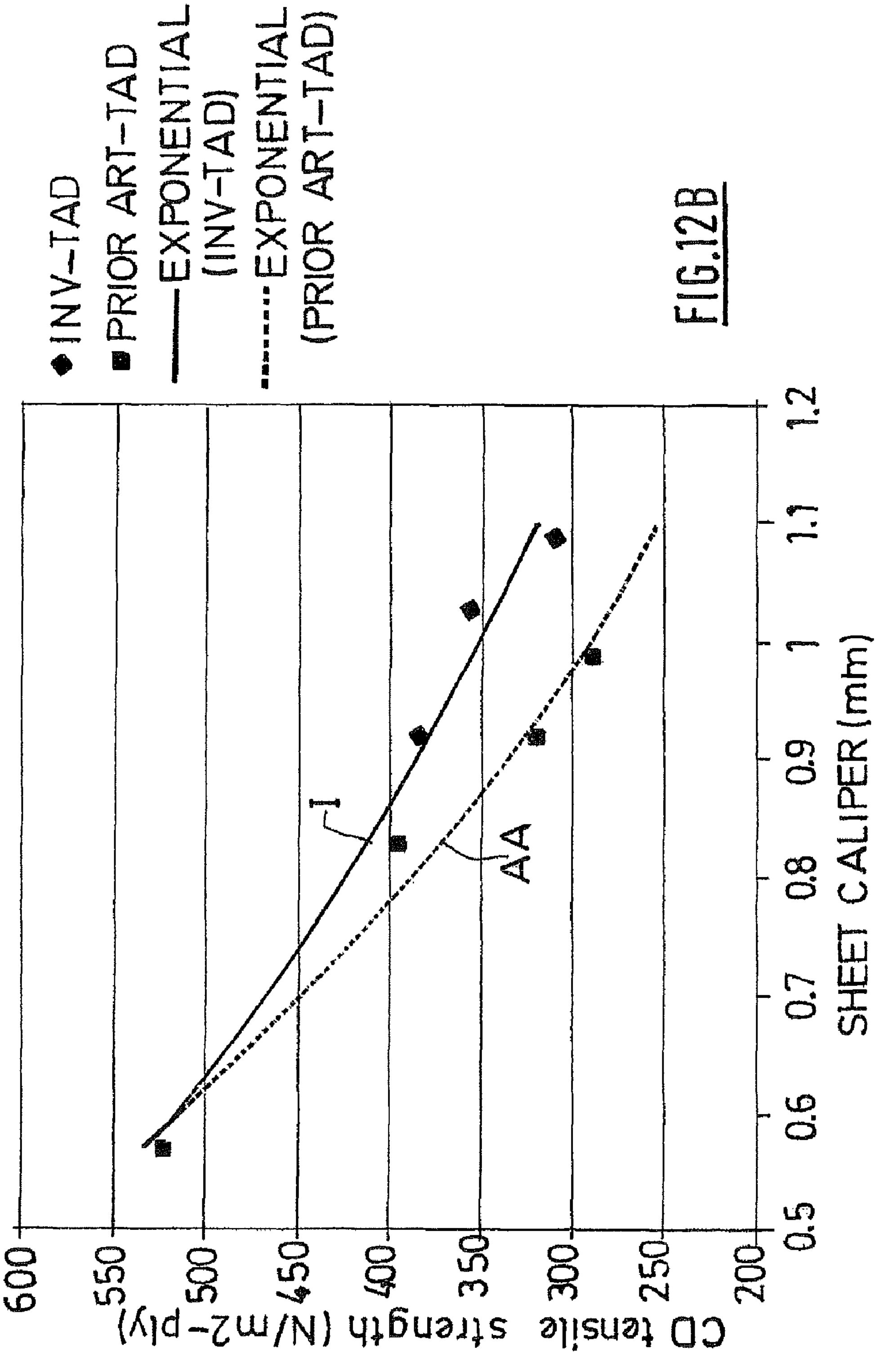

FIGS. 12A and 12B illustrate the tensile strength in the machine direction and in the cross direction, respectively, of a sheet according to the invention of the TAD type, compared with a sheet of the same type according to the prior art, as a function of sheet thickness.

For FIGS. 12A and 12B, the sheet according to the invention comprised two plies associated using the nested mode and had a basis weight of the order of 40 $g/m^2$. The embossing was that of FIG. 1.

The sheet according to the prior art was identical except as regards the embossing pattern which in this instance corresponded to that of FIG. 10.

The tests were performed in accordance with NF-EN-12625-4 standard.

FIGS. 12A and 12B show, through the two straight lines plotted relative to the measured points, a trend whereby the sheets according to the invention have better tensile strength than the sheets according to the prior art, irrespective of the direction considered (machine direction FIG. 12A or cross direction FIG. 12B).

The particular and innovative arrangement of the protrusions according to the invention therefore afford numerous not insignificant technical advantages in addition to an entirely novel and attractive visual appearance.

The invention claimed is:

1. A cut or precut absorbent sheet intended for wiping, comprising:

at least two plies or groups of plies of creped absorbent paper with a basis weight ranging between 12 and 35 g/m2 per ply, at least one of the plies comprising an embossed pattern made up of a plurality of protrusions protruding towards another of the plies of the sheet and forming cavities between the respective plies of the sheet;

wherein some of the protrusions are distributed over at least one of the plies in such a way as to define portions of curves which form concentric circles around or near a geometric center of an outline of the sheet, and in that of the plurality of protrusions belonging to one ply of the sheet forms alignments which constitute an embossed pattern with central symmetry with respect to the geometric center of the of outline of the sheet.

2. The absorbent sheet as claimed in claim 1, wherein the embossed pattern exhibits symmetry of order 2.

3. The absorbent sheet as claimed in claim 1, wherein at least 50% of the protrusions are aligned along curve portions.

4. The absorbent sheet as claimed in claim 1, wherein the embossed pattern comprises a central zone formed of concentric circles.

5. The absorbent sheet as claimed in claim 1, wherein the embossed pattern comprises a central zone formed of protrusions aligned in a spiral.

6. The absorbent sheet as claimed in claim 1, wherein the embossed pattern comprises a central zone, and a complementing zone that complements the central zone and is formed of mutually parallel lines of protrusions.

7. The absorbent sheet as claimed in claim 6, wherein the lines of protrusions are straight.

8. The absorbent sheet as claimed in claim 6, wherein the lines of protrusions are curved.

9. The absorbent sheet as claimed in claim 1, wherein two of the embossed plies are associated with one another in an arrangement of a nested type.

10. The absorbent sheet as claimed in claim 1, wherein at least two of the plies are associated with one another by adhesive bonding.

11. The absorbent sheet as claimed in claim 1, wherein the protrusions have a mean density ranging between 2 and 50 per cm2.

12. A roll formed of sheets as claimed in claim 1, each of the sheets being connected along two of its sides by perforated lines.

* * * * *